Oct. 31, 1939.   J. OSTLER ET AL   2,178,122
POWER EQUALIZING DEVICE
Filed Jan. 11, 1938   3 Sheets-Sheet 1

Inventors:
Josef Ostler
and Kurt Zwick
by
Cumpston & Shepard
their attorneys

Oct. 31, 1939. J. OSTLER ET AL 2,178,122
POWER EQUALIZING DEVICE
Filed Jan. 11, 1938   3 Sheets-Sheet 3

Inventors
Josef Ostler
Kurt Zwick
By Cumpston & Shepard
their Attorneys

Patented Oct. 31, 1939

2,178,122

UNITED STATES PATENT OFFICE 2,178,122

POWER EQUALIZING DEVICE

Josef Ostler and Kurt Zwick, Munich, Germany, assignors to Friedrich Deckel, Munchen-Prinz Ludwigshöhe, Bavaria, Germany Application January 11, 1938, Serial No. 184,446 In Germany January 14, 1937

15 Claims. (Cl. 74—590)

This invention relates to power equalization devices for balancing one force, such for instance as the force of gravity acting on a movable part, with another force, such for instance as the power of a spring. Such devices are used frequently in machine tool construction where, for example, one part is mounted for movement upwardly and downwardly, and is to be counterupbalanced exactly or approximately by the force of a spring. As the movable part moves upwardly or downwardly, the spring is extended to a greater or lesser degree, which in turn changes the power or force of the spring. Consequently some provision must be made for equalizing the varying power of the spring, when the movable part is moved, with the substantially constant force exerted by gravity on the movable parts.

Such equalization devices, in the forms heretofore known, have not been wholly satisfactory because suitable provision has not been made for changing the magnitude of the power delivered, for example, by the spring, when a change is made in the magnitude of the other power or force to be balanced thereby. For instance, the machine tool part which is movable upwardly or downwardly and which is to be counterbalanced by the spring, may be changed in weight due to the adding or taking away of a tool or another part. This change in weight of the movable part requires a corresponding change in the force to be exerted by the counterbalance spring in order to counterbalance properly the new magnitude of weight. The provisions heretofore suggested for such change in the force of the spring have been cumbersome, unwieldy, and unsatisfactory, and difficult to get at and adjust, due to the construction of the machine tools in which such devices are used.

Accordingly, it is an object of the present invention to provide a simplified and improved power equalization device having means for quick and easy adjustment or variation in the power ratio, in order that the power or force delivered, for example, by the spring may quickly and easily be adjusted to compensate for a change in the weight of the connected part to be counterbalanced, or to compensate for a desired change in the extent or degree to which the weight of the movable part is to be counterbalanced. In other words, the weight of the movable part of the machine tool may be changed by adding or taking away a tool or other part, or possibly during part of the operation of the tool it will be desired to counterbalance the weight of the movable part fully, while during another part of the operation it may be desired to counterbalance the weight only partially and leave part of the weight not counterbalanced. In either event, the device of the present invention may be used to accomplish the desired result quickly and easily by changing the force or power exerted on the movable member by the spring.

Another object of the invention is the provision of such a device which is simple, efficient, and inexpensive to construct, and which is so constructed that it may be placed at an accessible part of the machine tool, so that it may be operated conveniently and without difficulty.

To these and other ends the invention resides in certain improvements and combinations of parts, all as will be hereinafter more fully described, the novel features being pointed out in the claims at the end of the specification.

In the drawings.

The same reference numerals throughout the several views indicate the same parts.

Figures 1, 2, 3, 4, 8, 9:
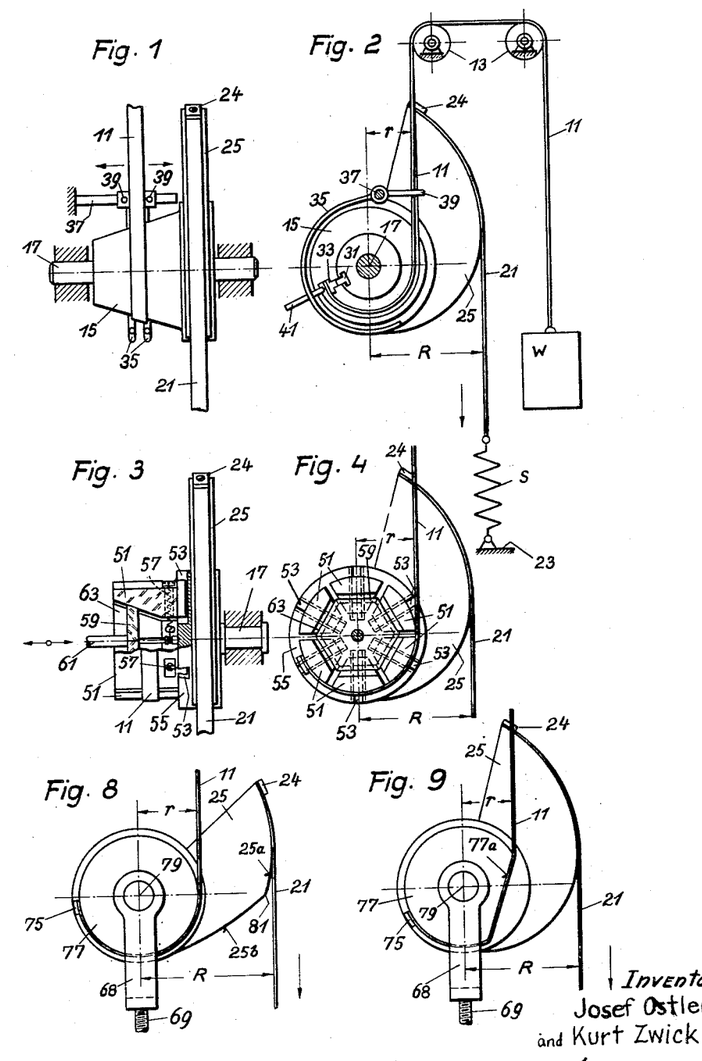
Fig. 1 is a side view of part of a device constructed in accordance with one embodiment of the present invention.
Fig. 2 is an end view of the same, also showing diagrammatically the spring and the movable part counterbalanced thereby.
Fig. 3 is a view similar to Fig. 1 showing a modified construction.
Fig. 4 is an end view of the construction shown in Fig. 3.
Fig. 8 is a view of still another modification.
Fig. 9 is a view of still another modification of the invention.

Referring now to the modification disclosed by way of example in Figs. 1 and 2 of the drawings, there is shown at W the weight or other part to be counterbalanced, and at S the spring or other suitable member providing the force or power for counterbalancing the weight W. The member W may represent any part of any machine tool or the like which is to be moved upwardly or downwardly and which is to be wholly or partially counterbalanced during its upward or downward movements. For example, the weight W may represent a pantograph linkage assembly, a movable beam, or other suitable linkage or part carrying a tracing stylus or a cutting tool or both, in an engraving or copying machine. The device of the present invention is particularly useful in connection with counterbalancing such parts of engraving and copying machines, but may be used also in connection with various movable parts of various machine tools or the like.

The weight W is supported by means such, for example, as the band 11 passing upwardly from W, over pulleys 13, and downwardly to connection with a rotary member 15 mounted on the shaft 17. The force exerted on the band 11 by the weight W tends to turn the rotary member 15 in a counterclockwise direction. This tendency is resisted by the band 21 connected to the upper end of the spring S, the lower end of which spring is connected to a fixed part 23, such as the base of the machine. The band 21 extends upwardly to and is connected at 24 to a rotary member 25 which is secured to or integral with the rotary member 15. The force exerted by the band 21 tends to turn the rotary member 25 in a clockwise direction thus counterbalancing the counterclockwise force exerted by the weight W.

As the weight W moves upwardly and downwardly, the spring S, which may be a coiled spring for example, is distended to a greater or lesser extent. When the spring is distended or lengthened, it pulls with greater force or power on its band 21, and when the spring is shortened, by upward movement of the weight W, it exerts a smaller force on its band 21. In order to equalize these variable forces exerted by the band 21 with the substantially constant force exerted by the band 11 in all positions of the weight W, the rotary member 25 to which the band 21 is connected is preferably constructed so that the surface on which the band lies is spiral rather than circular. The spiral surface is arranged in such a way that when the rotary member 25 turns in a counterclockwise direction, upon lowering of the weight W and extension of the spring S, the radius R of the effective lever arm of the band 21 is decreased, and when the member 25 rotates in a clockwise direction upon raising the weight W and decreasing the length of the spring S, then the effective lever arm R is increased. The characteristics of the spiral surface are so chosen with relation to the force characteristics of the spring S that, for any given position of rotation of the member 25, the product of the lever arm R times the force of the spring S will be substantially constant. Thus, notwithstanding the position assumed by the weight W in its upward or downward range of travel, the spring S will at all times tend to turn the member 25 in a clockwise direction with a substantially constant torque, which will thus counterbalance the weight W to the desired constant extent in all positions.

If, now, it is desired to change the magnitude of the weight W, or to change the degree to which this weight is to be counterbalanced by the spring, this may be done, according to the present invention, by changing the effective lever arm $r$ with which the band 11 acts upon the rotary member 15. According to this embodiment of the invention, the rotary member 15 is formed with portions of different diameters, with any one of which the band 11 may cooperate. These portions of different diameters may, for example, be a series of stepped portions (a series of cylindrical portions of different diameters), or may more conveniently be in the form of a conical surface as indicated in Figs. 1 and 2 of the drawings. Thus by moving the band 11 in a direction along the length of the cone, it may be made to cooperate with different diameters of the conical surface 15, in order to change the effective lever arm $r$.

In order to permit this adjustment of the band 11 along the cone 15, the cone is provided with an under cut channel or T-shaped slot 31 extending in the direction of one of the geometrical elements of the conical surface, and the end of the band 11 is secured to a slide member or lug 33 which is movable along this slot or guide 31. Thus the end of the band will be properly connected to the rotary member 15 in any position to which the band may be moved along this rotary member.

Shifting of the band along the rotary member to portions of different diameters may be accomplished by means of a pair of rods 35 which are mounted on a shaft 37 extending substantially parallel to the shaft 17, and which may be moved in a direction along the cone 15 either by shifting the rods 35 along their shaft 37, or by moving the entire shaft 37 lengthwise if the rods 35 be fixed thereto. These rods 35 have ends 39 which extend laterally in one direction from the shaft 37, on opposite sides of the band 11, and have main portions which extend laterally in the opposite direction from the shaft 37 and curve around the cone 15 as indicated in the drawings. A pin 41, secured to the end of the band 11 or to the slide member 33 secured to this band, extends approximately radially outwardly between the two rods 35 and is embraced thereby. Thus, when the rods 35 are moved in one direction or the other along the cone, these rods will act on the pin 41 to move this pin to slide the member 33 along the slot 31 to the required position, while the extensions 39 will act directly on the band 11 itself and serve as a guide to hold this band 11 in the desired plane perpendicular to the shaft 17 so that it will cooperate with the cone 15 at a point where the cone has the desired diameter.

By moving the rods 35, 39 to the left in Fig. 1, the band 11 will be made to cooperate with a portion of the cone 15 which is of smaller diameter, thus reducing the effective lever arm $r$ of the band, with the result that the product of the weight W times the lever arm $r$ will be made smaller, if the weight remains unchanged. This will have the effect of increasing the degree to which the weight is counterbalanced by the spring S, and if desired the weight can be overcounterbalanced so that the weight will tend to rise and must be held down by some other force that mere gravity. Such leftward movement of the rods 35, 39 can also be made to equalize the force of the spring S with a new and greater magnitude of the weight W, as might be required if an additional tool or part were added to the part of the machine indicated diagrammatically by W.

Similarly, a movement of the rods 35, 39 to the right in Fig. 1, will cause the band 11 to cooperate with a portion of the cone 15 which is of greater diameter, and thus will increase the effective lever arm $r$ of the band 11. This will have the effect of equalizing the force W with the force S if the force W be decreased (as for example by removing a cutter or other tool from the part represented by W), or, if the force W remains constant, it will decrease the degree to which this force is counterbalanced by the spring S. The parts may thus be adjusted so that the torque exerted by the spring S on the rotary member 25 is less than the torque exerted by the weight W on the rotary member 15, with the result that the weight W will not be fully counterbalanced and will tend to move downwardly.

With this arrangement described, it is noted that no change in the connection of the spring S to the fixed member 23 is necessary. The adjustment is accomplished entirely by moving the rods 35, 39 in a direction axially of the cone 15, and since the cone may be placed relatively high up in the machine instead of at the bottom thereof, it follows that the adjusting mechanism may be made conveniently accessible and may be operated easily. It is no longer necessary to reach down to the bottom of the machine in an awkward manner in order to move the bottom end of the spring S with relation to the fixed part 23 in a direction axially of the spring, as has heretofore been necessary in some of the prior constructions proposed.

A modified form of construction operating on substantially the same principles is illustrated in Figs. 3 and 4 of the drawings. Here, the weight W and the spring S may be the same as before, but are omitted to reduce the size of the drawing. The band 21 of the spring S may, as before, be fixed at 24 to the spiral rotary member 25 which may be identical with the member 25 previously described, and the band 11 from the weight W may extend over the pulleys 13 (not shown) and then downwardly to its rotary member, as before. The change in this modified construction, over the previously described construction, is that the rotary member which cooperates with the band 11, instead of being formed in the manner previously described, is in the form of several sector-shaped parts 51 having curved outer surfaces, these parts 51 each being displaceable radially outwardly or inwardly along individual guideways 53 formed in a plate member 55 which is secured to or integral with the rotary member 25. A series of tension springs 57, each connected at its outer end to one of the sector members 51 and at its inner end to a pin or the like on the member 55, tend to pull the members 51 radially inwardly. Against the tension of these springs 57, the sector members 51 may be spread or moved radially outwardly away from each other by the action of a wedge member or spreading member 59, capable of being operated in an axial direction by means of a shaft 61 and having an outer periphery which thrusts against inclined portions 63 on the inner faces of the members 51. By moving the shaft 61 and member 59 to the right in Fig. 3, the sector members 51 are forced radially outwardly along their respective guideways 53, against the action of the springs 57. By moving the members 59 and 61 to the left in Fig. 3, the sector members 51 are released so that the springs 57 may pull them radially inwardly.

The outer surfaces of the sector members 51 are curved as shown in Fig. 4, so that in all positions of the sector members their outer surfaces form approximately a cylindrical surface, sufficiently accurately for the present purposes. One end of the band 11 is fixed to one of the sector members as at 63.

By moving the members 61 in one direction or the other to alter the effective diameter of the sector members 51, the lever arm $r$ of the band 11 is changed, with the same effect upon the ratio of the force W to the force S as above explained in connection with the previous embodiment of the invention.

Figure 10:
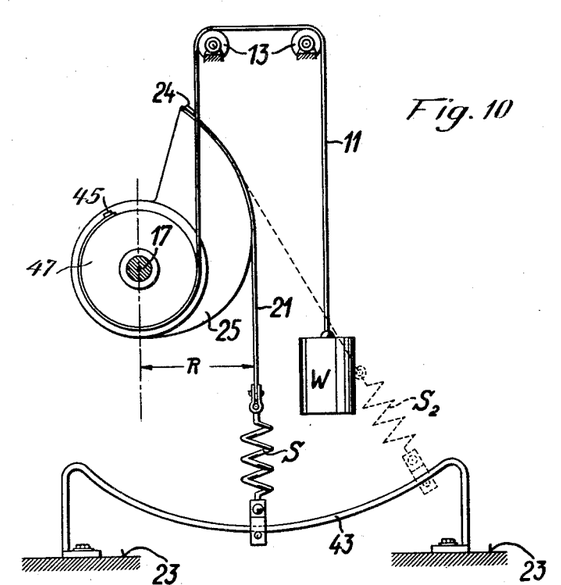
Fig. 10 is an end view of a device constructed in accordance with still another embodiment of the invention.
Figure 11:
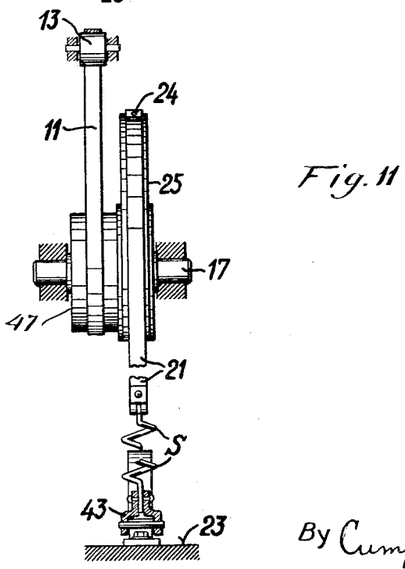
Fig. 11 is a side view of the same.

Still another modified construction by which the effect produced by the spring S on the band 11 of the weight W may be changed, is indicated in Figs. 10 and 11 of the drawings. As before, the weight to be counterbalanced is indicated at W and is connected to the band 11 running over the pulleys 13, the other end of the band being fastened at 45 to the rotary member 47, which in this instance may be a simple cylindrical member, since no ability to change its effective diameter is needed. The rotary member 47 is secured, as before, to the spiral rotary member 25, which may be the same as previously described, the two rotary members being mounted to turn together about the axis 17 as a center of rotation. The spring S, in the same manner previously described, pulls upon the band 21, rolling on the spiral surface of the member 25 and connected to it at 24.

In this modified construction, instead of securing the lower end of the spring S in fixed position on the base 23, the end of the spring is made slidable to different positions along an arcuate member 43 which lies in substantially the same vertical plane with the spiral surface of the rotary member 25. This member 43 is secured in fixed relation to the base 23 or other fixed part of the machine, and may be in the form of a metal arcuate bar, around which the end of the spring or a clip connected thereto extends, so that the bottom end of the spring may readily be moved along the arcuate bar to different positions, without substantially changing the distension of the spring or the position of the weight W by such movement. A change in the position of the spring along the bar 43 will have the result of changing the radius or lever arm R at which the spring band 21 acts on the rotary member 25, for any given position of the weight W. If the spring be moved to the right in Fig. 10, from the position shown in full lines to the position shown in dotted lines at $S_2$, then the point at which the band 21 is tangent to the spiral rolling surface of the member 25 (for any given position of weight W) will be farther from the center of rotation 17 than was the case in the full line position, with consequent increase of the effective lever arm R. Thus the spring, for any given degree of extension thereof, will produce a greater torque on the rotary member 25.

By moving the lower end of the spring leftwardly along the arcuate bar 43, the effective lever arm R will be decreased and the torque produced by the spring on the rotary equalizing members will be decreased. Thus, by shifting the lower end of the spring back and forth in one direction or the other, the torque produced by the spring may be readily adjusted to the required magnitude, to have the desired effect on the weight W. In this modified construction, it is noted that it is the length of the lever arm R of the band 21 which is changed, rather than the length of the lever arm $r$ of the band 11. It is also noted that, in adjusting the spring, the spring is moved in a direction laterally or transverse to its length or axis, and the lower end of the spring is not moved in the direction of its length or axis, as in certain proposed prior constructions. This movement in a direction laterally or transverse to the axis of the spring can usually be accomplished much more easily and conveniently than a movement in a direction axially of the spring.

Figure 5:
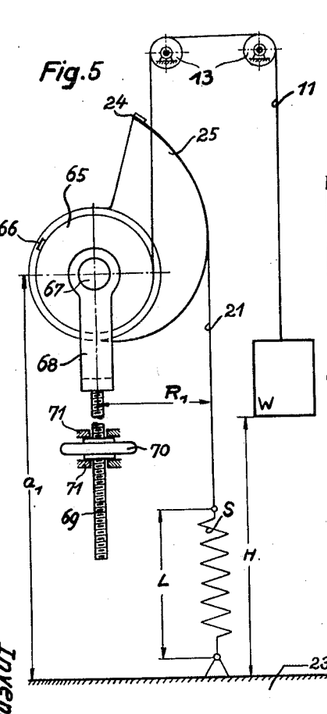
Fig. 5 is a diagrammatic view illustrating an equalizing device according to another embodiment of the present invention, with the parts in one position.
Figure 6:
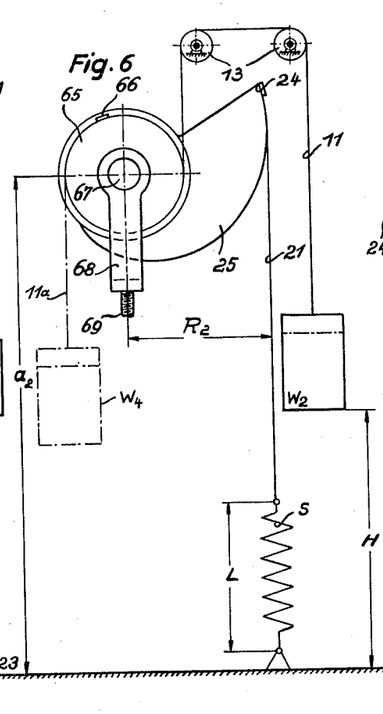
Fig. 6 is a similar view showing the parts adjusted to a different position.
Figure 7:
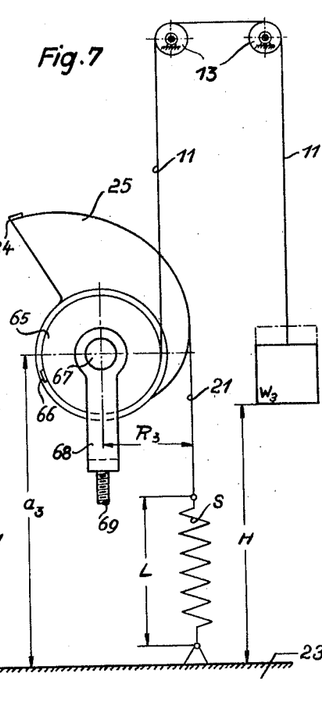
Fig. 7 is a similar view showing the parts adjusted to still another position.

Still another modified construction by which the effect produced by the spring S on the band 11 of the weight W may be changed, is illustrated in Figs. 5, 6 and 7 of the drawings. In this modified construction the band connected to the weight W is indicated as before by the numeral 11, and the end of this band is connected at 66 to the rotary member 65 on the shaft 67. This rotary member is a plain cylindrical member of invariable diameter. The band connected to the spring S is indicated as before as 21, which band is connected at 24 to the rotary member 25 integral with or operatively connected to the rotary member 66. The periphery of the member 25 is developed spirally and has the same characteristics as the member 25 described in connection with Figs. 1 and 2.

For a typical given position of the parts, as indicated diagrammatically in Fig. 5, the length of the spring S may be indicated by L, the height of the part W may be indicated by H, and the lever arm or radius at which the force of the spring is acting on the rotary means at this moment may be indicated by $R_1$. The height of the rotary axis 67 above any suitable reference plane, such as the base 23, may be indicated by $a_1$.

According to this embodiment of the present invention, the desired change in the torque produced by the spring on the rotary means is obtained easily and effectively by moving the rotary axis 67 in a direction approximately parallel to the direction of the bands 21 and 11, that is, in an upward or downward direction, which movement will have the effect of lengthening or shortening the radius or lever arm $R_1$ of the spring force S, for any given position of the movable part W.

This upward or downward movement of the axis 67 is readily accomplished by mounting the axis in a yoke 68 which is fastened to a long screw 69 extending downwardly therefrom, the screw being engaged by a nut in the form of a hand wheel 70, or the like, which nut is held against upward and downward movement by suitable fixed abutments or stops 71. Turning the hand wheel 70 thus causes the screw 69 to move upwardly or downwardly carrying the rotary axis 67 to the desired new elevation.

If the magnitude of the weight W is increased to the greater magnitude $W_2$ indicated diagrammatically in Fig. 6, this will produce a greater counterclockwise torque on the rotary means 65, 25 and the clockwise torque produced by the spring S must, therefore, be increased to maintain the weight in equilibrium or at the desired degree of counterbalance. To do this, the hand wheel 70 is turned to move the rotary axis 67 upwardly. This upward movement will cause clockwise rotation of the rotary means, rolling more of the band 11 onto the member 65 and rolling some of the band 21 off of the member 25, but without substantially changing the height H of the weight $W_2$ or the length L of the spring S for this particular height of the weight. The clockwise rotation of the rotary means will, however, have the effect of increasing the lever arm or torque arm from the length $R_1$ to the new length $R_2$, as plainly seen by a comparison of Fig. 6 with Fig. 5, because the turning of the member 25 will make the point of tangency of the band 21 with this member farther from the center of rotation 67 than was previously the case for any given position of the weight $W_2$. The new height of the rotary axis 67 is indicated at $a_2$, and the system will now again be in equilibrium or at the desired degree of counterbalance.

If the weight W is decreased to the smaller magnitude indicated diagrammatically at $W_3$ in Fig. 7, the weight will produce a smaller counterclockwise torque on the rotary means 65, 25, and therefore the clockwise torque produced by the spring S must be correspondingly reduced in order to maintain the system in equilibrium or at the desired degree of counterbalance, if that be greater or less than exact equilibrium. Consequently, by turning the hand wheel 70 the rotary axis 67 is moved downwardly to the new height $a_2$. This does not substantially affect the height of the weight $W_3$, which still is indicated at H, or the length of the spring S indicated at L. It does, however, cause counterclockwise turning of the rotary means 65, 25, rolling more of the band 11 off of the member 65 and more of the band 21 onto the member 25, in such manner that the lever arm $R_3$ of the band 21 is reduced. This reduces the torque produced by the spring, and brings the system once more into the desired state of counterbalance.

If it is not necessary that the weight W be kept at a substantially constant height when the rotary axis 67 is moved upwardly or downwardly to change the torque produced by the spring, then the band 11 need not extend upwardly from the member 65 and around the pulleys 13 but may be led directly downwardly from the opposite side of the member 65, as indicated in dotted lines at 11a in Fig. 6, to the weight indicated at $W_4$. In this event, the construction operates just as above described, except that upward or downward movement of the axis 67 would produce a still greater upward or downward movement, respectively, of the weight $W_4$.

The arrangement above described for varying the torque produced by the spring is exceedingly satisfactory and efficient. The rotary means 65, 25 may be placed at a convenient elevation in the machine, with the hand wheel 70 likewise at a convenient elevation and in a readily accessible location so that the parts may be adjusted easily and quickly whenever required, without the necessity of stooping over to make adjustments close to the bottom of the machine or the floor level as has heretofore been necessary in certain similar devices heretofore proposed.

It is sometimes desirable that the counterbalancing effect produced on the weight W by the spring should not be substantially constant for all upward or downward positions of the weight W, but should increase or decrease at a certain part of the upward and downward range of travel of the weight W. This may be accomplished, according to the present invention, in one or the other of the ways illustrated in Figs. 8 and 9.

Referring first to Fig. 8, the band connected to the weight W is indicated as before by numeral 11, and the end of this band is connected at 75 to the rotary member 77 on the shaft 79. The rotary member 77 may be of a form corresponding to member 15 in Figs. 1 and 2, or of a form corresponding to the members 51, 53, etc., in Figs. 3 and 4, or of a form corresponding to the member 65 in Figs. 5, 6 and 7.

The band connected to the spring S (not shown) is indicated as before at 21, which band is connected at 24 to the rotary member 25 integral with or operatively connected to the rotary member 77. The part of the periphery of the member 25 closest to the end 24 of the band 21 is developed spirally, as indicated at 25a, and has the same characteristics as the corresponding part of the member 25 particularly described in connection with Figs. 1 and 2. At a suitable intermediate point 81 on the periphery of the member 25 which cooperates with the band 21, there is a change in the shape of the periphery. From the corner 81 onwardly in a clockwise direction the peripheral portion 25b has a radius decreasing much more quickly or sharply than the theoretical spiral periphery which would give an equalized torque at all extents of distension of the spring. Consequently, during that part of the upward and downward movement of the weight W in which the band 21 is tangent to the portion 25a of the rotary member 25, the effect produced by the spring on the weight W will be substantially constant. When, however, the weight W has moved downwardly far enough so that the band 21 passes around the corner 81 and lies tangent to the portion 25b of the periphery, then the effective lever arm R of the band 21 decreases rapidly with further downward movement of the weight W, so that the torque produced by the spring on the members 25 and 77 is decreased. Thus the weight W, if previously in equilibrium with the spring, will now have a tendency to descend or move downwardly automatically when it reaches this point at which the band 21 passes over the corner 81. Likewise, the weight W may be only partly counterbalanced during the first part of its upward movement, and then when the band 21 rolls off of the portion 25b and onto the portion 25a, the weight and the spring force will thereafter be counterbalanced or equalized during the further upward movement of the weight.

Otherwise, if not the peripheral portion 25a but the peripheral portion 25b has the same characteristics as the corresponding part of the member 25 described in connection with Figs. 1 and 2, and from the corner 81 onwardly in a counterclockwise direction the peripheral portion 25a has a radius decreasing much more quickly or sharply than the theoretical spiral periphery (e. g., the radius of a circle), then the weight W may be completely equalized during the first part of its upward movement, and then when the band 21 rolls off of the portion 25b and onto the portion 25a, the weight will thereafter be only partly counterbalanced during the further upward movement of the weight.

If it is desired to adjust the point at which the force system changes from complete counterbalance to partial counterbalance or vice versa (that is, to change the point in the upward or downward movement of the weight W at which the band 21 passes around the corner 81) this may be done by moving the rotary axis 79 upwardly or downwardly, as described before in connection with Figs. 5, 6 and 7. If the axis 79 be moved upwardly (without other change in the parts) this will roll more of the band 21 off of the member 25 and roll more of the band 11 onto the member 77, without substantially changing the elevation of the weight W, with the result that the weight W will have to be moved farther downwardly before the band passes around the corner 81 and the change in the force ratio takes place. Similarly, by moving the rotary axis 79 downwardly, more of the band 11 will be rolled off of the member 77 and more of the band 21 will be rolled onto the member 25, without substantially changing the elevation of the weight W, so that during the upward and downward movements of the weight W the band 21 will pass over the corner 81 at a higher elevation of the weight. In order to adjust the axis 79 upwardly or downwardly for this purpose, the axis may be mounted as before in a yoke 68 movable upwardly or downwardly by suitable means such as the screw 69. Upward movement of the axis 79 will also increase the effective lever arm R for any given position of the weight W, thus increasing the torque effect produced by the spring S, while downward movement of the axis 79 will have a contrary effect, but this change in the torque effect can be cancelled by other suitable adjustments if it is desired to raise or lower the axis 79 for the purpose merely of changing the position of the weight W at which the corner 81 will be effective, without otherwise increasing or decreasing the torque produced by the spring.

A somewhat similar construction, by means of which a constant weight W can be made to effect an automatic movement in part of its range of travel, is illustrated in Fig. 9. Here, as before, the band connected to the weight W is indicated at 11, and its end is connected at 75 to the rotary member 77 mounted on the shaft 79, as before. The band connected to the spring S is indicated at 21, and is connected at 24 to the rotary member 25, which may be the same as the rotary member 25 described in connection with Figs. 1 and 2. That is, the entire peripheral surface of the member 25 on which the band 21 rolls may be of spiral form, as in Fig. 2, instead of having the sharp corner 81 and the altered periphery shown in Fig. 8.

The rotary member 77 is provided with a circular or approximately circular periphery throughout most of its circumference (which periphery may be stepped or conical, as in Figs. 1 and 2, or expansible and contractible as in Figs. 3 and 4) but has at one point a flattened spot or side 77a of suitable extent depending upon the range of movement of the weight W through which it is desired to have this weight make an automatic movement. When the band 11 is rolling on the circular portion of the periphery of the member 77, then the weight and the spring force will be in equilibrium with each other, or in such constant relation to each other as may be desired. Assuming that the weight W is at the lower end of its range of movement, if it now moves upwardly, this will cause more of the band 11 to be rolled onto the member 77 and will cause clockwise rotation of the members 77 and 25, until finally the band 11 reaches the lower corner of the flat spot 77a. Then, during further upward movement of the weight W, the effective lever arm r of the band 11 will rapidly decrease in the range of this flat spot 77 so that the torque produced on the member 77 by the band 11 will decrease (assuming that the weight W remains of constant magnitude) while the torque produced on the member 25 by the band 21 will remain constant. Thus, in the range of movement corresponding to the flat spot 77a the weight W will be overbalanced and will tend to rise automatically unless forcibly restrained therefrom. As soon as the weight has risen far enough so that the band 11 has passed the upper corner of the flat spot and becomes tangent to the circular part of the periphery of the member 77 above the flat spot, then the condition of equilibrium or other desired condition between the weight W and the spring force is re-established, and the automatic upward movement of the weight W ceases, and the weight and spring force will be equalized. Of course the spring force can be so adjusted with relation to the weight that they will be equalized only when the band 11 is cooperating with the flat spot 77a and so that when the band 11 rolls on the circular periphery of the member 77 the weight W will be underbalanced by the spring and the weight will tend to descend. If the forces be adjusted for this operation, the weight will tend to descend in all of its positions except the position corresponding to the flat spot 77a and in that position the weight and the spring will be in equilibrium.

As in the case of the construction shown in Fig. 8, the point in the range of movement of the weight W at which this change in the power ratio takes place can be varied by moving the rotary axis 77 upwardly or downwardly to roll more of the band 11 onto the member 77 and to roll more of the band 21 from the member 25, or vice versa. This upward and downward adjustment of the axis 79 may be accomplished as before, by mounting the axis 79 in a yoke 68 movable upwardly and downwardly by adjusting means, such as the screw 69.

It is now seen that in these embodiments of the invention above disclosed, provision has been made for changing either the effective lever arm r of the weight W or the effective lever arm R of the spring S, in order to change the power or force ratio between the spring S and the weight W. In some instances, as in Figs. 1 to 7, the change in the lever arm is made manually from time to time, as a matter of adjustment, to meet new conditions. In other instances, as in Figs. 8 and 9, the change in the effective lever arm is accomplished automatically whenever the weight W reaches a certain position in its range of movement or travel, without further manual adjustment.

The constructions disclosed are highly effective and advantageous in use, and are exceedingly simple and easy to operate and maintain in working order, compared to prior constructions of adjustment heretofore proposed.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

We claim:

1. The combination of a frame, rotary means rotatable about an axis fixed with respect to said frame, said rotary means having two peripheral surfaces spaced from said axis, extensible spring means secured to said frame, a flexible member connected to said spring means and placed under tension thereby, said flexible member being also connected to said rotary means and wound on one of said peripheral surfaces so that the tension of said flexible member produces a torque in one direction on said rotary means, a part movable upwardly and downwardly with respect to said frame, a second flexible member connected to said movable part and placed under tension by the weight thereof, said second flexible member being also connected to said rotary means and wound in the opposite direction on the other of said peripheral surfaces so that the tension thereof produces a torque in the opposite direction on said rotary means, and means independent of movement of said axis for changing the distance from said axis at which one of said flexible members acts on said rotary means, thereby to change the torque produced on said rotary means by said one of said flexible members for any given magnitude of tension thereof.

2. The combination of a frame, rotary means rotatable about an axis fixed with respect to said frame, said rotary means having two peripheral surfaces spaced from said axis, extensible spring means secured to said frame, a flexible member connected to said spring means and placed under tension thereby, said flexible member being also connected to said rotary means and wound on one of said peripheral surfaces so that the tension of said flexible member produces a torque in one direction on said rotary means, a part movable upwardly and downwardly with respect to said frame, a second flexible member connected to said movable part and placed under tension by the weight thereof, said second flexible member being also connected to said rotary means and wound in the opposite direction on the other of said peripheral surfaces so that the tension thereof produces a torque in the opposite direction on said rotary means, and means independent of movement of said axis for changing the distance from said axis at which said flexible member connected to said movable part acts on said rotary means, to change the torque produced on said rotary means by any given magnitude of weight of said movable part.

3. The combination of a frame, rotary means rotatable about an axis and having two peripheral surfaces spaced from said axis, one of said peripheral surfaces having at different positions lengthwise of said axis different portions at different distances from said axis, spring means mounted on said frame, a flexible member connected to said spring means and placed under tension thereby, said flexible member being also connected to said rotary means and wound on one of said peripheral surfaces so that the tension of said flexible member produces a torque in one direction on said rotary means, a part movable upwardly and downwardly with respect to said frame, a second flexible member connected to said movable part and placed under tension by the weight thereof, said second flexible member being also connected to said rotary means and wound in the opposite direction on the other of said peripheral surfaces so that the tension thereof produces a torque in the opposite direction on said rotary means, and means for shifting in a direction along said axis that one of said flexible members which is wound on said peripheral surface having different portions at different distances from said axis, to bring said one of said flexible members into cooperation with one or another of said different portions, to vary the torque produced on said rotary means by said one of said flexible members for any given magnitude of tension thereof.

4. The combination of a frame, rotary means rotatable about an axis and having two peripheral surfaces spaced from said axis, one of said peripheral surfaces being of generally conical form, spring means mounted on said frame, a flexible member connected to said spring means and placed under tension thereby, said flexible member being also connected to said rotary means and wound on one of said peripheral surfaces so that the tension of said flexible member produces a torque in one direction on said rotary means, a part movable upwardly and downwardly with respect to said frame, a second flexible member connected to said movable part and placed under tension by the weight thereof, said second flexible member being also connected to said rotary means and wound in the opposite direction on the other of said peripheral surfaces so that the tension thereof produces a torque in the opposite direction on said rotary means, and means for shifting that one of said flexible members which is wound on said surface of conical form, in a direction lengthwise of said rotary axis, to bring it into cooperation with a portion of said surface of different diameter, to vary the torque produced on said rotary means by any given magnitude of tension in said one of said flexible members.

5. A construction as described in claim 4, further including a guideway on said peripheral surface of conical form, said guideway extending in the general direction of a geometrical element of said conical surface, a slide member slidable lengthwise along said guideway, and means connecting said slide member to that one of said flexible members which is wound on said conical surface.

6. The combination of a frame, rotary means rotatable about an axis and having two peripheral surfaces spaced from said axis, one of said peripheral surfaces being formed by a series of members mounted for movement toward and away from said axis to vary the effective distance of said one of said peripheral surfaces from said axis, spring means mounted on said frame, a flexible member connected to said spring means and placed under tension thereby, said flexible member being also connected to said rotary means and wound on one of said peripheral surfaces so that the tension of said flexible member produces a torque in one direction on said rotary means, a part movable upwardly and downwardly with respect to said frame, a second flexible member connected to said movable part and placed under tension by the weight thereof, said second flexible member being also connected to said rotary means and wound in the opposite direction on the other of said peripheral surfaces so that the tension thereof produces a torque in the opposite direction on said rotary means, and means for shifting said movable members of said rotary means toward and away from said axis to vary the effective distance from said axis at which the flexible member wound on said movable members acts on said means, to vary the torque produced on said rotary means by any given magnitude of tension of said flexible member.

7. The combination of a frame, rotary means rotatable about an axis and having two peripheral surfaces spaced from said axis, one of said peripheral surfaces having a portion of one general shape and another portion of a different general shape, spring means mounted on said frame, a flexible member connected to said spring means and placed under tension thereby, said flexible member being also connected to said rotary means and wound on one of said peripheral surfaces so that the tension of said flexible member produces a torque in one direction on said rotary means, a part movable upwardly and downwardly with respect to said frame, and a second flexible member connected to said movable part and placed under tension by the weight thereof, said second flexible member being also connected to said rotary means and wound in the opposite direction on the other of said peripheral surfaces so that the tension thereof produces a torque in the opposite direction on said rotary means and so that the weight of said movable part is counterbalanced at least in part by the power of said spring means, the degree of counterbalancing changing during upward and downward movements of said movable part when said rotary means is turned to a position at which the flexible member wound on said surface having two portions of different shapes ceases to cooperate with one of said portions and begins to cooperate with the other of said portions.

8. The combination of a frame, rotary means rotatable about an axis and having two peripheral surfaces spaced from said axis, one of said peripheral surfaces having different portions at different distances from said axis and substantially in a common plane approximately perpendicular to said axis, spring means mounted on said frame, a flexible member connected to said spring means and placed under tension thereby, said flexible member being also connected to said rotary means and wound on one of said peripheral surfaces so that the tension of said flexible member produces a torque in one direction on said rotary means, a part movable upwardly and downwardly with respect to said frame, and a second flexible member connected to said movable part and placed under tension by the weight thereof, said second flexible member being also connected to said rotary means and wound in the opposite direction on the other of said peripheral surfaces so that the tension thereof produces a torque in the opposite direction on said rotary means, that one of said flexible members which is wound on said peripheral surface having different portions at different distances from said axis being mounted for swinging movement approximately in said plane to vary the distance from said axis at which said one of said flexible members acts on its said peripheral surface for any given position of said movable part, to change the torque produced by any given magnitude of tension of said one of said flexible members.

9. The combination of rotary means mounted for rotation about an axis and having two peripheral surfaces spaced from said axis, one of said surfaces being so shaped that successive points along said surface in one direction are progressively farther away from said axis, spring means, a flexible member connected to and tensioned by said spring means, said flexible member being connected also to said rotary means and wound on one of said peripheral surfaces so that the tension thereof produces a torque in one direction on said rotary means, an upwardly and downwardly movable part, a second flexible member connected to said movable part and tensioned by the weight thereof, said second flexible member being connected also to said rotary means and wound on the other of said peripheral surfaces in the opposite direction so that the tension thereof produces a torque in the opposite direction on said rotary means, and means for moving said axis of said rotary means in a direction approximately parallel to the direction at which one of said flexible members leaves said surface having points progressively farther from said axis, to change the angular relation of said rotary means to said last mentioned flexible member for any given magnitude of tension therein, thereby to change the distance from said axis at which said last mentioned flexible member acts on said rotary means and the torque produced thereby for any given magnitude of tension therein.

10. The combination of rotary means mounted for rotation about an axis and having two peripheral surfaces spaced from said axis, one of said surfaces being so shaped that successive points along said surface in one direction are progressively farther away from said axis, spring means, a flexible member connected to and tensioned by said spring means, said flexible member being connected also to said rotary means and wound on one of said peripheral surfaces so that the tension thereof produces a torque in one direction on said rotary means, an upwardly and downwardly movable part, a second flexible member connected to said movable part and tensioned by the weight thereof, said second flexible member being connected also to said rotary means and wound on the other of said peripheral surfaces in the opposite direction so that the tension thereof produces a torque in the opposite direction on said rotary means, both of said flexible members leaving their respective peripheral surfaces of said rotary means in directions approximately parallel to each other, and means for moving said axis of said rotary means in a direction aproximately parallel to said directions of said flexible members.

11. The combination of rotary means mounted for rotation about an axis and having two peripheral surfaces spaced from said axis, one of said surfaces being so shaped that successive points along said surface in one direction are progressively farther away from said axis, spring means, a flexible member connected to and tensioned by said spring means, said flexible member being connected also to said rotary means and wound on one of said peripheral surfaces so that the tension thereof produces a torque in one direction on said rotary means, an upwardly and downwardly movable part, a second flexible member connected to said movable part and tensioned by the weight thereof, said second flexible member being connected also to said rotary means and wound on the other of said peripheral surfaces in the opposite direction so that the tension thereof produces a torque in the opposite direction on said rotary means, a journal member on which said axis of said rotary means is mounted, and screw means for moving said journal member to shift said axis to change the angular relationship of said peripheral surface having points progressively farther from said axis to its associated flexible member, to alter the lever arm with which said last mentioned flexible member acts on said rotary means and the torque produced thereby for any given magnitude of tension of said last mentioned flexible member.

12. The combination of rotary means mounted for rotation about an axis and having one peripheral surface of generally circular form substantially concentric with said axis and having a second peripheral surface of generally spiral form, extensible spring means, a flexible member connected to and tensioned by said spring means, said flexible member being connected also to said rotary means and wound on one of said peripheral surfaces so that the tension thereof produces a torque in one direction on said rotary means, an upwardly and downwardly movable part, a second flexible member connected to said movable part and tensioned by the weight thereof, said second flexible member being connected also to said rotary means and wound on the other of said peripheral surfaces in the opposite direction so that the tension thereof produces a torque in the opposite direction on said rotary means, and means for shifting said axis of said rotary means in a direction approximately parallel to the direction at which one of said flexible members leaves said second peripheral surface, to vary the lever arm with which said last mentioned flexible member acts upon said rotary means for any given degree of extension of said spring means.

13. The combination of a power source, a part movable upwardly and downwardly to be counterbalanced at least partially by said power source, rotary means rotatable about an axis and having two peripheral surfaces spaced from said axis, a flexible member connected to said power source and to said rotary means and wound on one of said peripheral surfaces so that when said power source pulls on said flexible member it will produce a torque tending to turn said rotary means in one direction, a second flexible member connected to said movable part and placed under tension by the weight thereof, said second member being connected to said rotary means and wound on the other of said peripheral surfaces in a direction opposite to the winding direction of said first flexible member so that the tension of said second member will produce a torque tending to turn said rotary means in the opposite direction, and means for changing the distance from said rotary axis at which one of said flexible members acts upon said rotary means for a given position of said movable part and given magnitude of force exerted by said power source.

14. A power equalizing device comprising a movable part capable of exerting force, a source of power for connection with said movable part, said source of power exerting different magnitudes of force when said movable part is in different positions, rotary means rotatable about an axis, means connecting said source of power to said rotary means at a point offset from said axis so that the force of said source of power produces a torque on said rotary means in one direction, means connecting said movable part to said rotary means at a point offset from said axis so that the force of said movable part produces a torque on said rotary means in the opposite direction, and means for changing the lever arm with which one of said forces acts on said rotary means, for a given position of said movable part, to change the ratio of the torque produced by said source of power to the torque produced by said movable part.

15. A power transmitting device comprising spring means exerting different magnitudes of force when deformed to different extents, rotary means mounted to turn about an axis, said rotary means including a surface approximately spiral at least in part, a flexible member operatively connected to said spring means and to said rotary means and wound on said surface of said rotary means in such manner that when said rotary means turns and thereby deforms said spring means to a greater or lesser extent, said flexible member acts on said rotary means with a lever arm progressively increasing as the deformation of said spring means decreases and with a lever arm progressively decreasing as the deformation of said spring means increases, an upwardly and downwardly movable part to be counterbalanced at least partially by said spring means, a second surface on said rotary means, said second surface being at least partially rounded, a second flexible member operatively connected to said movable part and to said rotary means and wound on said second surface thereof in a direction to act on said rotary means with a lever arm producing a torque of opposite direction from that produced by said spring means, and means for varying the length of the lever arm with which one of said flexible members acts on said rotary means, for any given position of said movable part.

JOSEF OSTLER.
KURT ZWICK.